United States Patent
Shaffer et al.

(10) Patent No.: US 8,005,497 B2
(45) Date of Patent: Aug. 23, 2011

(54) FLOOR CONTROL OVER HIGH LATENCY NETWORKS IN AN INTEROPERABILITY AND COLLABORATION SYSTEM

(75) Inventors: Shmuel Shaffer, Palo Alto, CA (US); Larry R. Metzger, Wake Forest, NC (US)

(73) Assignee: Cisco Technology, Inc., San Jose, CA (US)

( * ) Notice: Subject to any disclaimer, the term of this patent is extended or adjusted under 35 U.S.C. 154(b) by 646 days.

(21) Appl. No.: 11/841,299

(22) Filed: Aug. 20, 2007

(65) Prior Publication Data

US 2009/0054010 A1 Feb. 26, 2009

(51) Int. Cl.
 *H04B 7/00* (2006.01)
 *H04W 4/00* (2009.01)
 *G06F 15/16* (2006.01)
 *H04Q 11/00* (2006.01)

(52) U.S. Cl. .................. 455/518; 455/519; 455/422.1; 709/204; 370/260

(58) Field of Classification Search .............. None
See application file for complete search history.

(56) References Cited

U.S. PATENT DOCUMENTS

| | | | | |
|---|---|---|---|---|
| 6,928,294 B2 * | 8/2005 | Maggenti et al. | | 455/518 |
| 6,965,767 B2 * | 11/2005 | Maggenti et al. | | 455/416 |
| 7,020,532 B2 * | 3/2006 | Johnson et al. | | 700/89 |
| 7,295,853 B2 | 11/2007 | Jin et al. | | |
| 7,408,890 B1 | 8/2008 | Doran et al. | | |
| 2003/0003938 A1 * | 1/2003 | O'Neill et al. | | 455/519 |
| 2003/0154249 A1 * | 8/2003 | Crockett et al. | | 709/204 |
| 2004/0001458 A1 | 1/2004 | Dorenbosch et al. | | |
| 2004/0081199 A1 * | 4/2004 | Lopez et al. | | 370/468 |
| 2004/0131042 A1 * | 7/2004 | Lillie et al. | | 370/351 |
| 2004/0133683 A1 * | 7/2004 | Keller et al. | | 709/227 |
| 2005/0135250 A1 * | 6/2005 | Singh et al. | | 370/235 |
| 2006/0154681 A1 * | 7/2006 | Park et al. | | 455/518 |
| 2006/0265451 A1 | 11/2006 | Tomimori | | |

(Continued)

FOREIGN PATENT DOCUMENTS

GB 2 358 997 A 8/2001
WO WO 00/57656 A 9/2000

OTHER PUBLICATIONS

Ericsson J. Camarillo, The Binary Floor Control Protocol, IEFT Standard, Internet Engineering Task Force, IETF, CH, Jan. 11, 2006, XO015055016,ISSN: 0000-0003, whole document.

*Primary Examiner* — Yuwen Pan
*Assistant Examiner* — Ayodeji Ayotunde
(74) *Attorney, Agent, or Firm* — P. Su

(57) ABSTRACT

Methods and apparatus for assigning floor control based upon when a floor control request was initiated are disclosed. In one embodiment, a method includes receiving a first request for floor control from a first endpoint and granting the floor control to the first endpoint. The method also includes receiving a second request for floor control from a second endpoint, that has approximately the same priority level as the first endpoint, and determining if the first request was initiated from the first endpoint at approximately the same time or earlier than the second request was initiated from the second endpoint. If it is determined that the first request was not initiated from the first endpoint at approximately the same time or earlier than the second request was initiated from the second endpoint, then floor control is preempted from the first endpoint and granted to the second endpoint.

23 Claims, 5 Drawing Sheets

U.S. PATENT DOCUMENTS

| | | |
|---|---|---|
| 2007/0004438 A1 | 1/2007 | Brusilovsky et al. |
| 2007/0021133 A1 | 1/2007 | Coulas |
| 2007/0036093 A1 | 2/2007 | Newberg et al. |
| 2007/0274337 A1* | 11/2007 | Purpura ........................ 370/465 |
| 2008/0200162 A1* | 8/2008 | Chowdhury et al. ....... 455/422.1 |
| 2008/0233990 A1* | 9/2008 | Jen ................................ 455/518 |

* cited by examiner

FLOOR CONTROL OVER HIGH LATENCY NETWORKS IN AN INTEROPERABILITY AND COLLABORATION SYSTEM

BACKGROUND OF THE INVENTION

The present invention relates generally to push-to-talk (PTT), or push to transmit, systems.

Agencies and organizations such as Emergency Response Teams (ERTs) often utilize PTT devices to facilitate their communication. PTT devices, which include two-way radios or other devices which support two-way communications, include a mechanism that may be engaged to transmit media, e.g., a voice signal or voice data, and disengaged to receive media. Some PTT systems facilitate floor control such that a specified number of end users, often only a single end user, may control the floor and send media on a given channel. All other end users associated with the channel may only listen to the specified number of end users who have control of the floor and, hence, receive media from those end users.

PTT systems may include both relatively high latency networks, such as a communication network over a satellite connection, and relatively low latency networks, such as local area networks (LANs). If an agency or organization member utilizes a PTT device on a low latency network, e.g., a local network, and an agency or organization utilizes a PTT device over a high latency network, e.g., a communication network over a satellite connection, both initiate requests for floor control at substantially the same time, the agency or organization that utilizes the PTT device on the low latency network will generally gain floor control. Hence, the difference in latency may place a remote user at a disadvantage when he or she is competing for floor control with a local user. It should be understood that the term "local user" refers to a user who is generally located within a substantially minimal short delay to the floor control server, while the term "remote user" refers to a user who accesses the floor control server over a relatively high delay network such as over a satellite connection.

BRIEF DESCRIPTION OF THE DRAWINGS

The invention may best be understood by reference to the following description taken in conjunction with the accompanying drawings in which.

DESCRIPTION OF THE EXAMPLE EMBODIMENTS

General Overview

Figure 1:
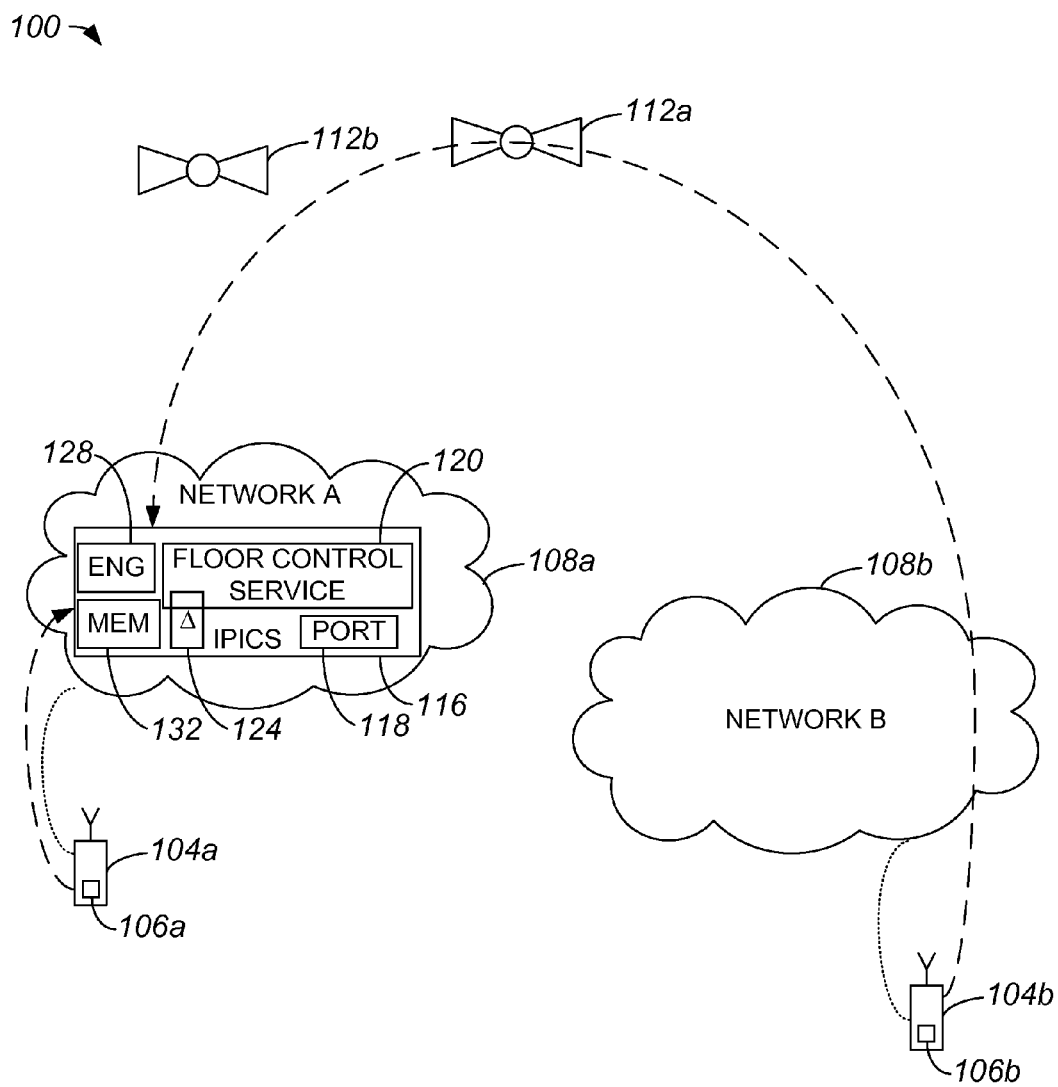
FIG. 1 is a block diagram representation of an overall system which includes high latency links in which users of push-to-talk (PTT) devices compete for floor control in accordance with an embodiment of the present invention.

In one embodiment, a method includes receiving a first request for floor control from a first endpoint and granting the floor control to the first endpoint. The method also includes receiving a second request for floor control from a second endpoint, that has approximately the same priority level as the first endpoint, and determining if the first request was initiated from the first endpoint at approximately the same time or earlier than the second request was initiated from the second endpoint. If it is determined that the first request was not initiated from the first endpoint at approximately the same time or earlier than the second request was initiated from the second endpoint, then floor control is preempted from the first endpoint and granted to the second endpoint.

Description

Interoperability and collaboration system facilitate coordinated, interagency response for emergencies and day-to-day operations. In general, interoperability and collaboration systems allow radio networks, IP networks, non-IP networks, telephones, cell phones, and computing devices to communicate. The Cisco Internet Protocol Interoperability and Collaboration System (IPICS), which is available commercially from Cisco Systems, Inc., of San Jose, Calif., is one interoperability and collaboration system that facilitates the convergence of radio and internet protocol (IP) networks. An interoperability and collaboration system may be used to facilitate tactical deployment over relatively high latency links such as satellite links, i.e., links associated with satellite communications.

Within a push-to-talk (PTT) system, substantially only a specified number of speakers may have floor control at any given time. That is, within a PTT system, a specified number of endpoints may have floor control such that a speaker associated with one of the endpoints may speak, while other endpoints that do not have floor control are relegated to listening to the speaker. In one embodiment, a PTT system allows floor control to be requested by a PTT device when a PTT button of the device is pressed or otherwise engaged. When floor control is granted to the requesting PTT device by an arbitrating function, the arbitrating function sends an indication that floor control is granted to the requesting PTT device. At substantially the same time, the arbitrating function may also send an indication that the requesting PTT device has floor control to other PTT devices serviced by the arbitrating function.

When a PTT system is deployed over relatively high latency links, floor control and PTT signals from some participants or endpoints may be transmitted over relatively low latency links, e.g., links with less than approximately 50 milliseconds (ms) of delay, while floor control and PTT signals from other participants or endpoints may be transmitted over relatively high latency links, e.g., satellite links with more than approximately 540 ms of delay. By estimating the delay in the transmissions of those signals that are transmitted over relatively high latency links, and then accounting for the delays when ascertaining which request for floor control should be accommodated, a system such as IPICS may then effectively equalize the probability of any participant or endpoint being granted floor control.

With reference to FIG. 1, an overall system which includes both high latency links and low latency links will be described in accordance with an embodiment of the present invention. A system 100 may include any number of networks 108a, 108b that support endpoints 104a, 104b, respectively, that may be PTT devices. Networks 108a, 108b may include, but are not limited to, local area networks (LANs), public telephone switched networks (PTSNs), and radio networks. Each network 108a, 108b however, may include any number of smaller networks. For instance, each network 108a, 108b may include one or multiple LANs, one or multiple PTSNs, one or multiple radio networks, or substantially any combination of a LAN, a PTSN, and a radio network. Additionally, smaller networks that may be included in each overall network 108a, 108b are not limited to LANs, PTSNs, and radio networks.

Network 108a includes an interoperability and collaboration system 116 that serves system 100. That is, interoperability and collaboration system 116 is local to network 108a, but also serves users substantially attached to network 108b. In one embodiment, interoperability and collaboration system 116 is IPICS, although it should be appreciated that interoperability and collaboration system 116 may be substantially any interoperability and collaboration system.

IPICS 116 includes a port arrangement 118 for receiving floor control requests, a floor control service 120, a topology and delay identification server 124, an engine arrangement 128, and a memory 132. Network 108a includes hardware and/or software logic embodied in a tangible medium that, when executed, grants floor control to endpoints 104a, 104b as appropriate. As shown, endpoints 104a, 104b include floor control functionality 106a, 106b, respectively. Topology and delay identification server 124, which cooperates with floor control server 120 and may be a part of floor control service 120, includes logic that determines round trip delay times associated with the transmission of information through satellites 112a, 112b to floor control service 120. It should be appreciated that in one embodiment, engine arrangement 128 may include an internet protocol policy engine (IPPE), and memory 132 may be arranged to store policies.

Floor control service 120 is arranged to grant floor control, and to preempt floor control, as appropriate. For example, if requests for floor control are received by IPICS 120 at substantially the same time from endpoints 104a, 104b, floor control service 120 may ascertain, in cooperation with topology and delay identification service 124, which request was sent first. Alternatively, if floor control is assigned to endpoint 104a because a request from endpoint 104a is received first, but floor control service 120 determines that a subsequently received request for floor control was actually sent first from endpoint 104b, floor control service 120 may preempt endpoint 104a and reassign floor control to endpoint 104b.

Topology and delay identification service 124 serves a variety of different functions. In general, topology and delay identification service 124 is configured to determine approximately half of a round trip delay between endpoint 104b and floor control service 120, as well as to determine approximately half of a round trip delay between a source of a stimulus and receivers of the stimulus that cause endpoint 104b to request execution of a floor control function. In one embodiment, the stimulus may be a ping message that is sent to endpoint 104b. As a result of the stimulus, endpoint 104b may send a reply back. The ping message may be a special ping message, or a part of a keep-alive signal between topology and delay identification service 124 and endpoint 104b. In one embodiment, topology and delay identification service 124 may utilize a Network Time Protocol (NTP) to assess the delay between sending, by endpoint 104b, and receiving, by floor control service 120, a PTT request.

As a request for floor control sent by endpoint 104b is subject to a delay because the request passes through at least one satellite 112b en route to IPICS 120, while a request for floor control sent by endpoint 104a is local to IPICS 120, topology and delay identification service 124 may consider the delay in determining when the request was actually originated by endpoint 104b. In other words, topology delay identification service 124 accounts for delays, e.g., approximately one half of a round trip delay, that are associated with relatively high latency links such as satellite communication links. Generally, delays associated with transmissions to and from satellites 112a, 112b are known to IPICS. It should be appreciated that such delays may be determined or otherwise obtained using a variety of different methods including, but not limited to, gathering information using ping messages sent from network 108b to IPICS 120 via satellite 112a, and manually programming a predetermined delay into IPICS 120. In accounting for a delay such as approximately one half of a round trip delay, a stimulus delay as well as other delays, e.g., an adaptive jitter-buffer depth of the audio system of endpoints 104a, 104b, may be accounted for.

Figure 2:
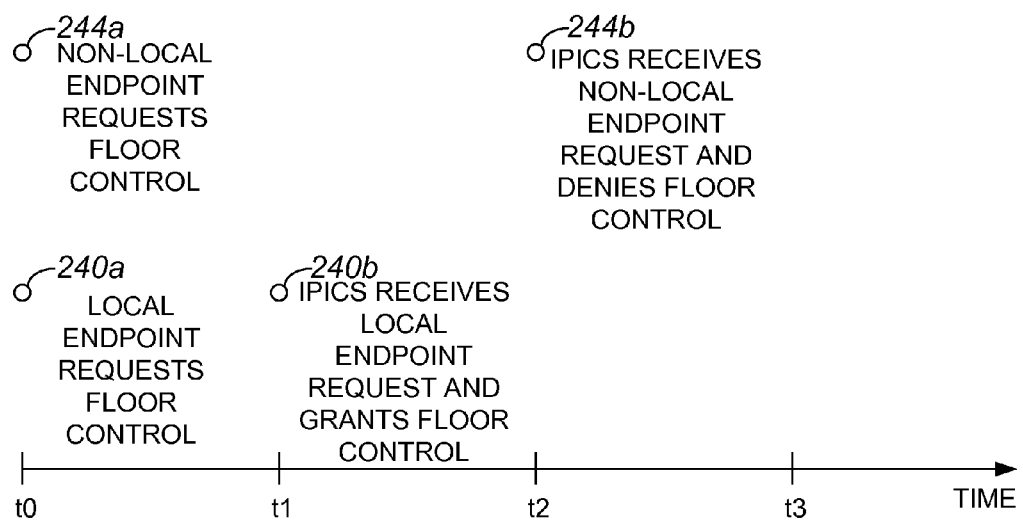
FIG. 2 is a diagrammatic representation of a timeline in which a local PTT device requests floor control at approximately the same time as, or earlier than, a non-local PTT device in accordance with an embodiment of the present invention.

FIG. 2 is a diagrammatic representation of a timeline in which a local endpoint, e.g., a PTT device that is local to a network which includes a floor control service, requests floor control at approximately the same time as, or earlier than, a non-local endpoint, e.g., a remote PTT device, in accordance with an embodiment of the present invention. It should be appreciated that the timeline is not drawn to scale, i.e., the intervals between various times on the timeline are not to scale, for ease of illustration. At approximately a time t0, events 240a, 244a occur. Event 240a involves a local endpoint sending a request for floor control and event 240b involves a non-local endpoint sending a request for floor control. In one embodiment, the request for floor control sent by the non-local endpoint is sent on high latency links such as satellite links. The requests have substantially equal priority, and are sent to an interoperability and collaboration system that includes a floor control service such as IPICS. For ease of discussion, an interoperability and collaboration system will be discussed as being IPICS, although it should be appreciated that substantially any interoperability and collaboration system that includes floor control capabilities may receive the requests. Although the requests from the local endpoint and the non-local endpoint are sent at approximately the same time, it should be appreciated that the request from the local endpoint, or the endpoint that is local to IPICS, may be sent earlier than the request from the non-local endpoint. That is, event 240a may occur earlier than event 244a.

At a time t1, an event 240b occurs in which IPICS receives the local endpoint request for floor control and grants floor control to the local endpoint. Then, at a time t2, an event 244b occurs in which IPICS receives the non-local endpoint request and denies floor control to the non-local endpoint. Floor control is denied to the non-local endpoint because the local endpoint already has floor control, and the request for floor control by the non-local endpoint was not sent or otherwise initiated prior to the request for floor control by the local endpoint. That is, the request for floor control does not have priority over the request for floor control by the local endpoint.

Figure 3:
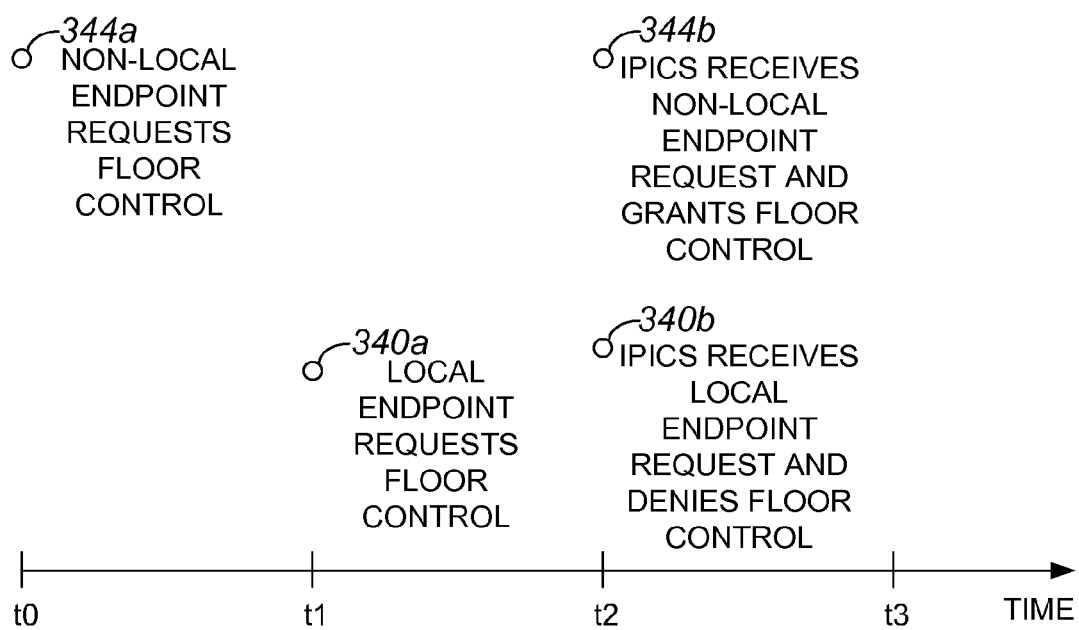
FIG. 3 is a diagrammatic representation of a timeline in which a floor control request that is sent earlier is received at the same time as floor control request that is sent later in accordance with an embodiment of the present invention.

Referring next to FIG. 3, a timeline of events that occur when a floor control request that is sent earlier is received by IPICS at substantially the same time as floor control request that is sent later will be described in accordance with an embodiment of the present invention. At a time t0, an event 344a occurs in which a non-local endpoint requests floor control by sending a request to IPICS. At a time t1, an event 340a occurs in which a local endpoint requests floor control by sending a request to IPICS. Events 340b, 344a occur at a time t2. Event 340b involves IPICS receiving the request from the local endpoint and denying floor control to the local endpoint. Event 344b involves IPICS receiving the request from the non-local endpoint and granting floor control to the non-local endpoint.

Although events 340b, 344b occur at substantially the same time, the non-local endpoint is granted floor control because IPICS determines that the non-local endpoint requested floor control first. Such a determination may be made based on the round trip delay or, more specifically, half of the round trip delay, associated with the request for floor control from the non-local endpoint. In general, a topology and delay identification service such as server 124 of FIG. 1 may ascertain the associated delay, and allow a determination to be made that the request for floor control from the non-local endpoint was made prior to the request for floor control from the local endpoint.

Figure 4:
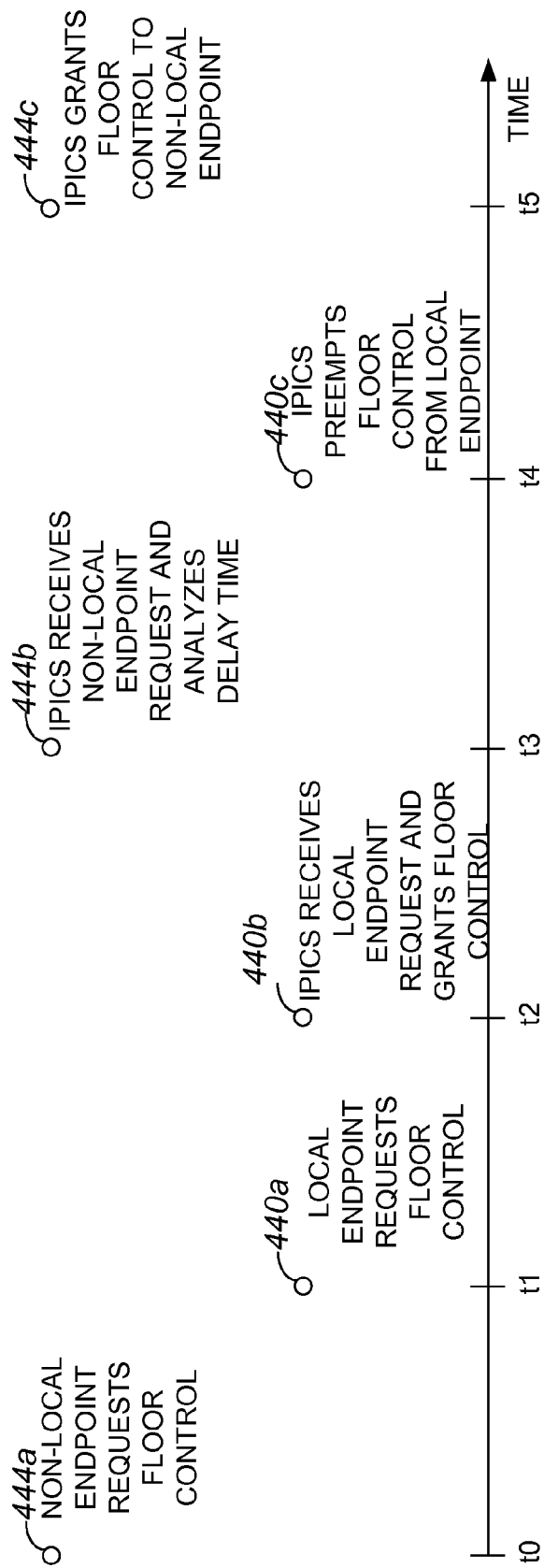
FIG. 4 is a diagrammatic representation of a timeline in which a first floor control request that is sent earlier than a second floor control request is received later than the second floor control request in accordance with an embodiment of the present invention.

In general, if floor control has been granted to a first received request, but it is subsequently determined that a second received request, which may have substantially the same priority as the first received request, was actually sent prior to the first received request, floor control may be rescinded from the initiator of the first received request, and granted to the initiator of second received requested. FIG. 4 is a diagrammatic representation of a timeline in which a first floor control request that is sent earlier than a second floor control request and is subsequently received later than the second floor control request in accordance with an embodiment of the present invention. At a time t0, an event 444a occurs in which a non-local endpoint sends a request for floor control to IPICS. Then, at a time t1, an event 440a occurs in which a local endpoint requests floor control.

At a time t2, an event 440b occurs in which IPICS receives the request for floor control from the local endpoint, and grants floor control to the local endpoint. The local endpoint maintains floor control, and while the local endpoint has floor control at a time t3, an event 444b occurs in which IPICS receives the request for floor control from the non-local endpoint, and analyzes the delay time associated with the transmission of the request. Typically, the delay time is analyzed to ascertain whether the request for floor control from the non-local endpoint was initiated prior to that of the local endpoint.

In the described embodiment, the determination is that the request for floor control from the non-local endpoint was initiated at time t0 whereas the request for floor control from the local endpoint was initiated at time t1. Hence, at a time t4, an event 440c occurs in which IPICS preempts, removes, or rescinds the floor control from the local endpoint. Floor control is rescinded such that it may be granted to the non-local endpoint. Hence, at a time t5, an event 444c occurs in which IPICS grants floor control to the non-local endpoint.

Figure 5:
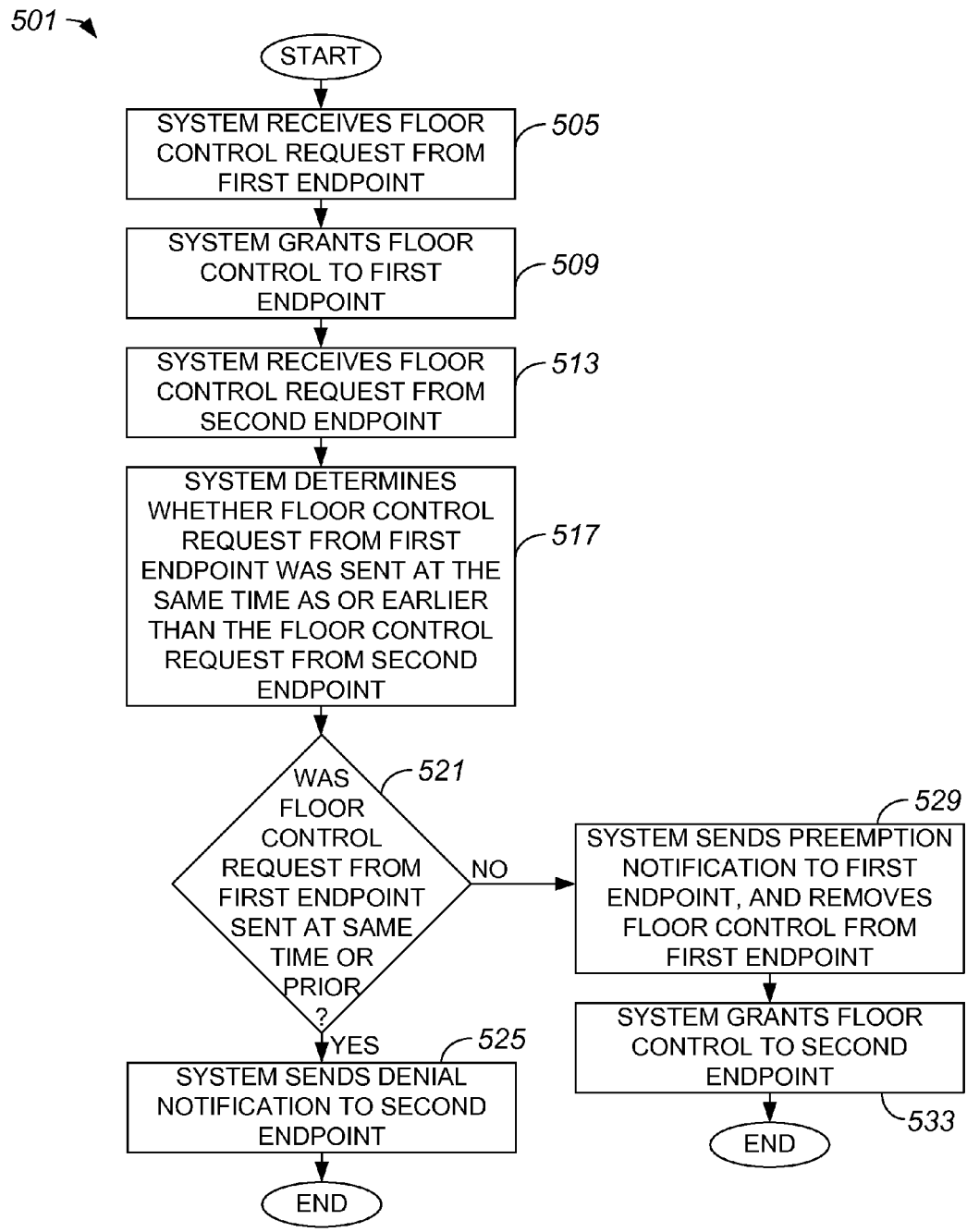
FIG. 5 is a process flow diagram which illustrates a method of processing floor control requests in accordance with an embodiment of the present invention.

FIG. 5 is a process flow diagram which illustrates a method of processing floor control requests in accordance with an embodiment of the present invention. A process 501 of processing floor control requests begins at step 505 in which a system, e.g., an interoperability and collaboration system that includes a floor control server, receives a floor control request from a first endpoint. The first endpoint may be, in one embodiment, a PTT or other mobile device. The floor control request may be received on a port or a receiver arrangement associated with the system.

After receiving the floor control request from the first endpoint, the system grants floor control to the first endpoint in step 509. For ease of discussion, it is assumed in the described embodiment that floor control is available such that floor control may be grated to the first endpoint. In granting floor control to the first endpoint, the system may provide a tone acknowledgement that is heard by at least the first endpoint.

In step 513, the system receives a floor control request from a second endpoint. The system then determines in step 517 whether the floor control request from the first endpoint was sent at approximately the same time as or earlier than the floor control request from the second endpoint. As time delays associated with various networks, e.g., time delays associated with satellite transmissions, are generally known, the roundtrip time delays associated with the floor control requests may be ascertained. The system may employ a delay discovery mechanism such as delay discovery mechanism of delay compensator 124 of FIG. 1 to determine the relative delay associated with the floor control requests.

A determination is made in step 521 as to whether the floor control request form the first endpoint was sent prior to or at approximately the same time as the floor control request from the second endpoint. If it is determined that the floor control request from the first endpoint was sent after the floor control request from the second endpoint, the indication is that the second endpoint should have floor control. Accordingly, process flow proceeds to step 529 in which the system sends a preemption notification to the first endpoint, as for example a preemption tone, and removes floor control from the first endpoint. Once the system removes or otherwise preempts the floor control of the first endpoint, the system grants floor control to the second endpoint in step 533. Granting floor control to the second endpoint may include sending a tone acknowledgement to at least the second endpoint that indications that the second endpoint has acquired floor control. After floor control is granted to the second endpoint, the process of processing floor control requests is completed.

Returning to step 521, if the determination is that the floor control request from the first endpoint was sent at the same time or prior to the floor control request from the second endpoint, the implication is that the first endpoint is entitled to floor control. As such, in step 525, the system sends a denial notification, e.g., a denial tone acknowledgement, to the second endpoint, and the process of processing floor control requests is completed.

Although only a few embodiments of the present invention have been described, it should be understood that the present invention may be embodied in many other specific forms without departing from the spirit or the scope of the present invention. By way of example, an interoperability and collaboration system that includes a floor control service has generally been described as IPICS. IPICS is an example of a suitable interoperability and collaboration system. In general, substantially any suitable interoperability and collaboration system that includes a floor control server may be used to implement the present invention.

The determination of which endpoint is granted floor control after requests from two endpoints are received has generally been described in terms of one request being received on a relatively low latency link and another request being received on a relatively high latency link. It should be appreciated, however, that multiple requests may be received. If multiple requests are received, after each request is received, an interoperability and collaboration system of the present invention may determine if the newly received request should be granted floor control. Similarly, if more than one request is received over a relatively high latency link, the delays associated with each received request may be accounted for in determining which received request is to be granted floor control.

In general, a PTT device may include a button or similar mechanism that is pushed to request floor control and released to relinquish floor control. That is, a PTT device may include a button that is pushed by a speaker when he or she wishes to speak, and is released by the speaker when he or she does not wish to speak. Such a button may be a dedicated hardware button, a dedicated software button, a programmable hardware or software button, or any suitable combination of the above. A button may also be arranged to detect an energy level, as for example a voice activity detection (VAD) or a voice operated switch (VOX). It should be appreciated, however, that a variety of different methods may be used to request and to relinquish floor control.

While a system with a central server-based floor control has generally been described, as for example with reference to FIG. 1, it should be understood by one skilled in the art that the present invention is not limited to being implemented with respect to systems with server-based floor control. The present invention may also be implemented, for example, in systems with distributed floor control architecture as well as systems which include a hybrid floor control in which the functionality of floor control is provided by cooperative centralized and distributed floor control systems.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

What is claimed is:

1. A method comprising:
receiving a first request for floor control from a first endpoint;
granting the floor control to the first endpoint;
receiving a second request for floor control from a second endpoint;
determining if the first request was initiated from the first endpoint at approximately the same time or earlier than the second request was initiated from the second endpoint, wherein
determining if the first request was initiated from the first endpoint at approximately the same time or earlier than the second request was initiated from the second endpoint includes ascertaining a delay associated with the second endpoint;
preempting the floor control from the first endpoint if it is determined that the first request was not initiated from the first endpoint at approximately the same time or earlier than the second request was initiated from the second endpoint; and
granting the floor control to the second endpoint after preempting the floor control from the first endpoint if it is determined that the first request was not initiated from the first endpoint at approximately the same time or earlier than the second request was initiated from the second endpoint.

2. The method of claim 1 further including:
initiating the second request from the second endpoint; and
sending the second request on at least one relatively high latency link, wherein the delay is associated with the relatively high latency link.

3. The method of claim 2 wherein the relatively high latency link is a satellite link.

4. The method of claim 2 wherein the delay is determined based on a Network Time Protocol (NTP).

5. The method of claim 2 wherein the delay is approximately one half of a round trip delay associated with sending the second request.

6. The method of claim 1 wherein preempting the floor control from the first endpoint includes sending a preemption notification to the first endpoint and granting the floor control to the second endpoint includes sending a floor control notification to the second endpoint.

7. Logic encoded in one or more non-transitory tangible media for execution and when executed operable to:
receive a first request for floor control from a first endpoint;
grant the floor control to the first endpoint;
receive a second request for floor control from a second endpoint;
determine if the first request was initiated from the first endpoint at approximately the same time or earlier than the second request was initiated from the second endpoint, wherein the logic operable to determine if the first request was initiated from the first endpoint at approximately the same time or earlier than the second request was initiated from the second endpoint is further operable to ascertain a delay associated with the second endpoint;
preempt the floor control from the first endpoint if it is determined that the first request was not initiated from the first endpoint at approximately the same time or earlier than the second request was initiated from the second endpoint; and
grant the floor control to the second endpoint after preempting the floor control from the first endpoint if it is determined that the first request was not initiated from the first endpoint at approximately the same time or earlier than the second request was initiated from the second endpoint.

8. The logic of claim 7 further operable to:
initiate the second request from the second endpoint; and
send the second request on at least one relatively high latency link, wherein the delay is associated with the relatively high latency link.

9. The logic of claim 8 wherein the relatively high latency link is a satellite link.

10. The logic of claim 8 wherein the delay is determined using a Network Time Protocol (NTP).

11. An apparatus comprising:
means for receiving a first request for floor control from a first endpoint;
means for granting the floor control to the first endpoint;
means for receiving a second request for floor control from a second endpoint;
means for determining if the first request was initiated from the first endpoint at approximately the same time or earlier than the second request was initiated from the second endpoint, wherein the means for determining if the first request was initiated from the first endpoint at approximately the same time or earlier than the second request include means for ascertaining a delay associated with the second endpoint;
means for preempting the floor control from the first endpoint if it is determined that the first request was not initiated from the first endpoint at approximately the same time or earlier than the second request was initiated from the second endpoint; and means for granting the floor control to the second endpoint after preempting the floor control from the first endpoint if it is determined that the first request was not initiated from the first endpoint at approximately the same time or earlier than the second request was initiated from the second endpoint.

12. The apparatus of claim 11 further including:
means for initiating the second request from the second endpoint; and
means for sending the second request on at least one relatively high latency link, wherein the delay is associated with the relatively high latency link.

13. The apparatus of claim 12 wherein the relatively high latency link is a satellite link.

14. The apparatus of claim 12 wherein the delay is determined based on a Network Time Protocol (NTP).

15. The apparatus of claim 12 wherein the delay is approximately one half of a round trip delay associated with sending the second request.

16. The apparatus of claim 11 wherein the means for preempting the floor control from the first endpoint includes means for sending a preemption notification to the first endpoint and means for granting the floor control to the second endpoint includes sending a floor control notification to the second endpoint.

17. An apparatus comprising:
a port arranged to obtain a first floor control request from a first endpoint and a second floor control request from a second endpoint;
a floor control service arranged to grant floor control to the first endpoint in response to the first floor control request when the first floor control request is obtained; and
a topology and delay identification service arranged to identify a delay associated with the second endpoint when the second floor control request is obtained, the floor control service being arranged to cooperate with the topology and delay identification service to use the delay to determine if the first floor control request was originated from the first endpoint no later than when the second floor control request was originated from the second endpoint, wherein if the first floor control request is determined to have originated from the first endpoint later than when the second floor request was originated from the second endpoint, the floor control service is arranged to preempt the floor control from the first endpoint and to grant the floor control to the second endpoint.

18. The apparatus of claim 17 wherein the first floor control request and the second floor control request have the same priority level.

19. The apparatus of claim 17 wherein at least the second floor control request is obtained via a relatively high latency link, and the delay is associated with the relatively high latency link.

20. The apparatus of claim 19 wherein the relatively high latency link is a satellite communications link.

21. The apparatus of claim 17 wherein the apparatus is an interoperability and collaboration system.

22. The apparatus of claim 17 wherein the first endpoint is a first push-to-talk device and the second endpoint is a second push-to-talk device.

23. The apparatus of claim 17 wherein if the first floor control request is determined not to have originated from the first endpoint later than when the second floor request was originated from the second endpoint, the floor control service is arranged to send a denial notification to the second endpoint, and wherein if the first floor control request is determined to have originated from the first endpoint later than when the second floor request was originated from the second endpoint, the floor control service is arranged to send a preemption notification to the first endpoint and a grant notification to the second endpoint.

* * * * *